US012272471B2

(12) United States Patent
Cui et al.

(10) Patent No.: US 12,272,471 B2
(45) Date of Patent: Apr. 8, 2025

(54) FINE GRAIN STRUCTURES FOR TOUGH RARE EARTH PERMANENT MAGNETS

(71) Applicant: Iowa State University Research Foundation, Inc., Ames, IA (US)

(72) Inventors: Baozhi Cui, Ames, IA (US); Jun Cui, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 733 days.

(21) Appl. No.: 16/974,145

(22) Filed: Oct. 19, 2020

(65) Prior Publication Data

US 2021/0134497 A1 May 6, 2021

Related U.S. Application Data

(60) Provisional application No. 62/974,009, filed on Nov. 6, 2019.

(51) Int. Cl.
*H01F 1/055* (2006.01)
*H01F 1/058* (2006.01)
(Continued)

(52) U.S. Cl.
CPC ........... *H01F 1/0557* (2013.01); *H01F 1/058* (2013.01); *H01F 1/059* (2013.01); *H01F 7/02* (2013.01); *H01F 41/0253* (2013.01)

(58) Field of Classification Search
CPC ...... H01F 1/055; H01F 1/0553; H01F 1/0555; H01F 1/0556; H01F 1/0557;
(Continued)

(56) References Cited

U.S. PATENT DOCUMENTS 8,377,233 B2 * 2/2013 Nakamura .......... H01F 41/0293 252/62.55
2005/0081960 A1 * 4/2005 Liu ...................... H01F 1/0577 148/105
(Continued)

FOREIGN PATENT DOCUMENTS

CN 105931777 A * 9/2016

OTHER PUBLICATIONS

Wang, G. P. et al. "Effects of sintering temperature on the mechanical properties of sintered NdFeB permanent magnets prepared by spark plasma sintering," Journal of Magnetism and Magnetic Materials, Aug. 27, 2013, vol. 349, pp. 1-4. (Year: 2013).*
E. P. Wohlfarth et al, Handbook of Magnetic Materials, vol. 4, pp. 71-106 and 174-192, 1988.
(Continued)

*Primary Examiner* — Ricardo D Morales

(57) ABSTRACT

The present invention provides fine grain structures for rare earth permanent magnets (REPMs) and their production in a manner to significantly enhance flexural strength and fracture toughness of the magnets with no or little sacrifice in the hard magnetic properties. The tough REPMs can have either homogeneous or heterogeneous refined grain microstructural architectures achieved by introducing a small amount of additive particle materials into the magnet matrix, such as fine-sized, insoluble, chemically stable, and nonreactive with the magnet matrix. These additive materials can act effectively as both heterogeneous nuclei sites and grain growth inhibitors during the heat treatment processes, which in turn resulting in refined grain structures of the REPMs. Alternatively, the fine grain structures were also achieved by using magnet alloy feedstock powders with finer particle sizes. The fine grains acting as the strengthening sites can inhibit the crack nucleation and can also slow down the propagation of micro-cracks, which in turn increasing magnet's fracture toughness.

14 Claims, 12 Drawing Sheets

(51) Int. Cl.
*H01F 1/059* (2006.01)
*H01F 7/02* (2006.01)
*H01F 41/02* (2006.01)

(58) Field of Classification Search
CPC ...... H01F 1/0558; H01F 1/053; H01F 1/0533; H01F 1/0536; H01F 1/057; H01F 1/0573; H01F 1/0574; H01F 1/0575; H01F 1/0576; H01F 1/0577; H01F 1/0578; H01F 1/058; H01F 1/059; H01F 1/0593; H01F 1/0596; H01F 1/08; H01F 1/083; H01F 1/086; H01F 7/02; H01F 41/0253; H01F 41/0266
See application file for complete search history.

(56) References Cited

U.S. PATENT DOCUMENTS

| | | | | |
|---|---|---|---|---|
| 2007/0071979 | A1* | 3/2007 | Komuro | C22C 19/07 428/404 |
| 2014/0210581 | A1* | 7/2014 | Lewis | C22C 19/03 148/101 |
| 2018/0151276 | A1* | 5/2018 | Li | H01F 41/0266 |
| 2019/0115128 | A1 | 4/2019 | Cui et al. | |

OTHER PUBLICATIONS

F. Bittner et al, Normal and abnormal grain growth in fine-grained Nd—Fe—B sintered magnets prepared from He jet-milled powders, Journal of Magnetism and Magnetic Materials, 426, pp. 698-707, 2017.
J.F. Liu et al, Microstructure and magnetic properties of sintered NdFeB magnets with improved impact resistance, J. Appl. Phys., 97, 10H101 2005.
W. Li et al, Study on strengthening and toughening of sintered rare-earth permanent magnets, J.Appl. Phys. 105 07A703 2009.
Xiuyan Li et al, Playing with defects in metals, Nature Materials vol. 16, pp. 700, 2017.
Xiaolei Wu et al, Heterogeneous lamella structure unites ultrafine-grain strength wiith coarse-grain ductility, Proceedings of the National Academy of Sciences of the United States of America, 112, p. 14501, 2015.
Yinmin Wang et al, High tensile ductility in a nanostructured metal, Nature, vol. 419, p. 912, 2002.
P.F. Cesar et al, Relationship Between Fracture Toughness and Flexural Strength in Dental Porcelains, Journal of Biomedical Materials Research Part B Applied Biomaterials, 78, p. 265, 2006.
L.C. Stearns et al, Particle-Inhibited Grain Growth in Al2O3—SiC II, Equlibrium and Kinetic Analysis, J. Am. Chem. Soc., 79, pp. 3020, 1996.
AndreyV. Karasev et al, Effects of Oxide Particles and Solute Elements on Austenite Grain growth in Fe-0.05 mass % C and Fe-10 mass % Ni Alloys, ISJI International, vol. 48, No. 5, p. 658, 2008.

* cited by examiner

FINE GRAIN STRUCTURES FOR TOUGH RARE EARTH PERMANENT MAGNETS

CONTRACTUAL ORIGIN OF THE INVENTION

This invention was made with government support under Contract No. DE ACO2-07CH11358 awarded by the U.S. Department of Energy. The government has certain rights in the invention.

FIELD OF THE INVENTION

The present invention relates generally to rare earth permanent magnets (REPMs) made by introducing a small amount of additive particle materials into the magnet matrix or by using fine powder precursors with beneficial refined grain structures as well as to magnet production methods. More particularly, the invention relates to fine grain structures for REPMs that significantly enhance flexural strength and fracture toughness of the magnets with no or little sacrifice in hard magnetic properties.

BACKGROUND OF THE INVENTION

Rare-earth permanent magnets (REPMs) mainly include R-cobalt type (mainly including $RCo_5$ and $R_2Co_{17}$ types, R=rare earth, Lanthanum, or Yttrium) magnets, R-iron-boron type ($R_2Fe_{14}B$ type or R-TM-B, TM is selected from a group of transition metals consisting but not limited to Fe, Co and other transition metal elements) magnets, a R-TM-carbon type magnet ($R_2Fe_{14}C$ type), a R-TM-nitrogen type magnet ($R_2Fe_{17}X_\delta$ type, R=rare earth, La, or Y; X═H, C, N, B, F, P, and/or S), or a R-TM-M-nitrogen type magnet ($R(Fe,M)_{12}X_\delta$ type, R=rare earth, La, or Y; M=Mo, V, Ti, Si, Al, Cr, Cu, Ga, Ge, Mn, Nb, Sn, Ta, W or Fe; X═H, C, N, B, F, P, and/or S), and some other stable or metastable rare-earth-transition metal based magnetic compounds. Sm—Co and Nd—Fe—B based sintered magnets are the most common commercial REPMs. REPMs have excellent hard magnetic properties, such as high magnetocrystalline anisotropy field $H_A$, high intrinsic coercivity $H_{ci}$, high or moderate high saturation magnetization $4\pi M_s$, high remanence $B_r$, high Curie temperatures $T_C$, and high maximum energy product $(BH)_{max}$ Nd—Fe—B magnets exhibit the highest room temperature magnetic properties while Sm—Co magnets are the ultimate choice for the applications at elevated temperatures in the range of 200-550° C. due to their excellent hard magnetic properties and thermal stability. REPMs have been widely used in energy conversion and storage, telecommunication, consumer electronics, magnetic storage, medical devices, sensors, and more.

However, REPMs have a high-risk of mechanical failure when subjected to mechanical stress such as vibration and mechanical shock since the intermetallic compounds of $Nd_2Fe_{14}B$, $SmCo_5$ and $Sm_2Co_{17}$ are very brittle intrinsically with an intergranular (Nd—Fe—B) or intragranular (Sm—Co) type fracture mechanism. $Nd_2Fe_{14}B$, $SmCo_5$ and $Sm_2Co_{17}$ compounds have the low symmetry tetragonal, hexagonal and rhombhedral crystal structures, respectively, that have an insufficient number of independent slip systems. Therefore, these compounds have little or no plastic deformation taking place before their fracture even though they have relatively high strength.

The commercial Sm—Co and Nd—Fe—B sintered magnets are brittle and prone to chipping, cracking or fracture in the courses of magnet manufacture, machining, shipping, assembly, and operation. The brittleness and poor machinability of these magnets leads to the production losses up to 30% and also imposes limitations on the magnet shapes and sizes. Especially, it is impossible for applications of REPMs subjected to high stress and vibration.

The improvement in the toughness of REPMs while maintaining their high magnetic performance would not only improve their manufacturing efficiency and machinability, reduce part failure rate and effectively use of expensive critical materials, but it would also greatly expand the market share for this class of permanent magnets, by offering opportunities for new applications, new shapes, and lower costs. Tougher REPMs could also make it possible for production of bulky magnets with even higher magnetic performance and larger dimensions. The tough magnets will be more robust for energy applications, more effective for the use of critical materials while reducing the pressure on critical material supply chain.

Improving the mechanical properties (mainly fracture toughness and flexural strength) of REPMs is of a great scientific, technical and practical significance. The research on the mechanical properties, strengthening and toughening of these magnets has been limitedly reported. Previous reports showed a 100% improvement in fracture toughness, 69% improvement in impact toughness, and 16% improvement in flexural strength for sintered Nd—Fe—B magnets through adjusting alloy compositions by the addition of small amounts of Nd, Dy and Pr; Al, Co, Cu, Ga, Mn, Nb, Ti, V, Zr or other transition metals, and mixtures thereof, and thus, forming fine precipitates within the grains, reducing grain size, engineering grain boundaries and/or lattice distortion. However, the alloying processes can change the electronic, magnetic and strain energy states of the lattice, or form alternative phases with completely different properties, especially the addition of non-magnetic elements, and thus, the hard magnetic properties are usually degraded.

The traditional and widely used alloying method makes magnet development higher cost, processing technique more complicate, and more resource-dependent that is associated with progressive resource exhaustion, supply uncertainty or even unavailability of critical elements/materials. Moreover, alloyed materials with complicated compositions may become more difficult to recycle. Up to now, the great challenge on effectively resolving the brittleness problem of the REPMs still remains.

Pending U.S. patent application Ser. No. 16/350,215 filed on Oct. 15, 2018, involves engineering the feedstock particle sizes and/or magnet grain sizes and subsequent grain boundary structure with a fixed chemical composition to substantially tune the mechanical toughness properties of the REPMs while maintaining their high magnetic performance. The formation of such heterogeneous microstructures, such as bi-modal, tri-modal, or multi-modal grain size structures, laminated, gridded, or gradient coarse/fine grain structures, or other microstructural heterogeneity and configurations, without changing the chemical compositions of magnets, was effective to increase toughness, as evidenced by an increased mechanical toughness property such as flexural strength and/or fracture toughness, of the REPMs. For the REPMs, heterogeneous structures and configurations with the combination of particle sizes or grain sizes ranging from nanometer, submicron (i.e. less than 1 micron) to several or tens of micron can have higher strength, while comparable ductility or brittleness compared with the microparticle structure in the commercial REPMs that have a single-modal coarse size of several or tens of micron made from commercial jet-milled powder precursors. The finer grains acting as the strengthening sites in the bi-modal, tri-modal, laminated, gridded or gradient coarse/fine grain size structures and the subsequent grain boundary engineering can slow down the propagation of micro-cracks, which in turn increasing the flexural strength and fracture toughness of the REPMs. On the other hand, the coarser grains of the microstructure have more anti-oxidation ability and the formation of stronger texture in the sintered magnets, which can result in little or no change to the hard magnetic properties.

SUMMARY OF THE INVENTION

The present invention provides fine grain microstructures for REPMs such as including, but not limited to, Sm—Co and Nd—Fe—B permanent magnets as well as other permanent magnets, and their production in a manner to significantly enhance flexural strength and fracture toughness of the magnets with no or little sacrifice in the hard magnetic properties. The novel tough REPMs can have either homogeneous or heterogeneous refined grain microstructural architectures. In a certain embodiment of the invention, the fine grain microstructures are achieved by introducing a small amount of additive particle material into the magnet matrix, such as, particles comprising carbides, fluorides, nitrides, oxides, sulfides, etc., and/or their mixtures. The additive particle material comprises fine-sized, insoluble, chemically stable, and non-reactive with the magnet matrix. These additive materials can act effectively as both heterogeneous nuclei sites and grain growth inhibitors during subsequent heat treatment processes to produce refined grain structures of the REPMs. In a certain other embodiment of the invention, the fine grain structures are achieved by using magnet alloy feedstock powders with finer particle sizes. The resulting fine grains of the magnet acting as the strengthening sites can inhibit the crack nucleation and can also slow down the propagation of micro-cracks, which in turn increasing magnet's fracture toughness. The tough magnets made by these certain embodiments will be more robust for energy applications, more effective for the use of critical materials while reducing the pressure on critical material supply chain. Also, these embodiments are cost-effective, and also compatible with the existing manufacturing processes.

Pursuant to a certain illustrative embodiment of the invention, a first type of feedstock employed to make the tough REPM is a mixture of the fine magnet alloy powders (for example, 99.5-90 wt. %) and a small amount of (for example, 0.5-10 wt. %) fine-sized, insoluble and non-reactive additive particle material, such as, particles comprising carbides, fluorides, nitrides, oxides, sulfides, etc., and/or their mixtures. Pursuant to a certain other illustrative embodiment, a second type of feedstock comprises 100% finer magnet alloy feedstock powders made by cryomilling of commercial jet milled powder (or using other techniques described below) to have an average particle or grain sizes ranging from submicron scale to micron scale that is smaller than that of the commercial powders (usually average particle or grain sizes in micron scale). Either of the two different types of feedstocks is used to produce the sintered REPMs of the Sm—Co type, with refined grain structures whose average grain sizes are significantly smaller (e.g. less than 40 microns, such as about 20 to about 35 microns average grain size) than those of the commercial Sm—Co magnet counterparts that have a coarser single-modal micron grain size (e.g. about 40-45 microns for typical $Sm_2Co_{17}$ type sintered magnets. For Nd—Fe—B type sintered magnets, powder feedstocks pursuant to certain other embodiments of the invention can be used to produce refined grain structures whose average grain sizes are significantly smaller (e.g. less than 10 microns, such as about 1 to about 5 microns average grain size) than those of the commercial Nd—Fe—B sintered magnet counterparts that have a coarser single-modal micron grain size (e.g. about 10 microns). This, in turn, can effectively increase flexural strength (a mechanical toughness property) of these and other REPMs.

The additive particle material within the magnet matrix can act effectively as both heterogeneous nuclei sites and grain growth inhibitors during the heat treatment processes, which in turn resulting in refined grain structures of the REPMs. The additive particle material is fine-sized, insoluble, chemically stable, and non-reactive with the magnet matrix. Homogeneous dispersion of fine additive particle material is desirable to effective intragranular nucleation. On the other hand, the fine additive particle material on magnet grain boundaries would be preferable to the inhibition of grain growth due to the Zener pinning of grain boundaries. According to the Zener type model, the pinning force $F_p$ from the fine additive particle materials to inhibit the grain growth is given by $F_p=3f\gamma_{GB}/2r$, where f is the additive particle volume fraction, $\gamma_{GB}$ is the grain boundary energy per unit area, and r is the additive particle radius. Therefore, a higher volume fraction, a finer average size, and better-dispersed additive fine particles, which has larger pinning force, can lead to finer grain size in the sintered REPMs.

The additive particle material includes but not limited to, particles comprising carbides, fluorides, nitrides, oxides, sulfides, and/or combinations of any of these materials. The morphologies of the additive particle material includes, but not limited to, particles, fibers, rods, tubes, dendrites, whiskers, or mesoporous structures in either nano-, submicron-, and/or micron-scales, and/or combinations of any of these material morphologies.

In the certain other embodiment of the invention, when using the 100% finer magnet alloy feedstock powders preferably having an average particle size of 0.1 to less than 1.5 microns, more preferably 0.1 to 1.0 micron, as the second type of feedstock, the higher volume fraction ratio, finer particle size, and better-dispersion of the rare-earth oxide micro-particles, which are formed during the magnet production processes, plays the most important role to produce the refined grain microstructures in the sintered REPMs (for example, Sm—Co and Nd—Fe—B magnets), compared with those of the commercial type reference magnet made from 100% commercial jet milled powder.

Embodiments of the present invention thus relate to powder feedstock and refined grain microstructure for REPMs and their production methods. More particularly, the invention relates to feedstock and sufficiently fine grain microstructure for REPMs to impart significantly enhanced toughness, while maintaining or with a minimum sacrifice in the hard magnetic properties. The novel tough REPMs have either homogenous or heterogeneous refined grain structures, without changing the chemical compositions of magnets except the non-reactive additive materials. As mentioned before, to increase flexural strength of the REPMs via reducing the magnet grain size, two different types of feedstock can be used independently.

For purposes of further illustration and not limitation, an illustrative first type of feedstock comprises 99.9-90 wt. %, such as for example 99.5-95 wt. %, commercial jet-milled Sm—Co or Nd—Fe—B microparticle powders (average particle size of about 2.3-5 microns), and 0.1-10 wt. %, such as, 0.5-5 wt. % additive materials (for example, $Sm_2O_3$ or $Nd_2O_3$ microparticles with an average size of about 0.3-1 micron). An illustrative second type of feedstock comprises 100 wt. % modified finer Sm—Co or Nd—Fe—B particle powders (average particle size of about 1-1.5 micron) made from further cryomilling of the commercial jet-milled Sm—Co or Nd—Fe—B microparticle powders (average particle size of about 2.3-5 microns). Embodiments of the present invention are cost-effective and also compatible with the existing manufacturing processes. Therefore, this invention is advantageous in that it can be easily integrated with the current industry production line for sintered REPMs.

Practice of the present invention thereby provides rare earth permanent magnets comprising a microstructure having a refined grain structure that improves a mechanical toughness property of the magnets while maintaining the excellent magnetic properties of the magnets. The novel mechanically strengthened magnets developed in this invention will be more robust for energy applications, more effective for the use of critical materials while reducing the pressure on critical material supply chain.

For purposes of further illustration of the first illustrative embodiment, using the feedstock of well-mixed mixtures of 1 wt. % or 3 wt. % $Sm_2O_3$ submicron particles (with an average particle size of about 0.35 micron), and balance jet milled powders (with an average particle size of about 2.3 microns), the average flexural strength values of $Sm_2O_3$—added $Sm_2Co_{17}$ type $Sm_2(CoFeCuZr)_{17}$ sintered magnets were enhanced by 30% or greater, for example, by about 30% (about 148 MPa) and 62% (about 185 MPa), respectively. The highest flexural strength value of about 199 MPa was achieved for selected specimens with the addition of 3 wt. % $Sm_2O_3$ submicron particles that was enhanced by about 75%. These are relative to a flexural strength value of about 114 MPa for the commercial counterpart magnet made using 100% jet milled powders (with an average particle size of about 2.3 microns). Excellent magnetic properties were maintained with the maximum energy product $(BH)_{max}$ values of about 26 MGOe, 26 MGOe, and 24.5 MGOe for the $Sm_2O_3$—added $Sm_2(CoFeCuZr)_{17}$ sintered magnets made from the feedstock of (100-x) wt. % jet milled powders+x wt. % (x=0, 1, 3) $Sm_2O_3$ cryomilled submicron particle powders, respectively. $(BH)_{max}$ (about 24.5 MGOe) decreased by only about 5.8% (less than 6%) for the magnet with the addition of 3 wt. % $Sm_2O_3$ submicron powders while no decrease of $(BH)_{max}$ for the magnet with the addition of 1 wt. % $Sm_2O_3$ submicron powders. There was almost no decrease of remanence $B_r$ values, those were about 10.6 kGs, 10.6 KGs, and 10.5 kGs for the $Sm_2(CoFeCuZr)_{17}$ sintered magnets with the addition of 0, 1, 3 wt. % $Sm_2O_3$ submicron particles, respectively. The intrinsic coercivity $H_{ci}$ values were about 32.7 kOe, 32.9 kOe, 33.4 kOe for the $Sm_2(CoFeCuZr)_{17}$ sintered magnets with the addition of 0, 1, 3 wt. % $Sm_2O_3$ submicron particles, respectively. The $H_{ci}$ values were slightly increased for the $Sm_2O_3$—added magnets due to the grain refinement with the addition of $Sm_2O_3$ submicron particles. That is, practice of the present invention achieved significant enhancement of mechanical toughness properties, such as flexural strength, with no or little degradation of the hard magnetic properties; e.g. $(BH)_{max}$, $B_r$ and $H_{ci}$, such as less than 6% degradation of $(BH)_{max}$, no decrease of $B_r$ and a slight increase of $H_{ci}$ at room temperature (20° C.). The $Sm_2O_3$ submicron particles were well dispersed within the magnet matrix. The average grain sizes of the $Sm_2O_3$—added sintered magnets were about 32 microns and 22 microns for the magnets with the addition of 1 wt. % and 3 wt. % $Sm_2O_3$ submicron particles (with an average particle size of 0.35 micron), respectively. Whereas, the average grain size of the commercial counterpart magnet was about 45 microns. All the magnets mentioned in this embodiment have a single-modal grain size distribution.

For purposes of further illustration of the second illustrative embodiment of the invention, using a feedstock of well-mixed mixtures of a portion 1): 3 wt. % $Sm_2O_3$ submicron particles (with an average particle size of about 0.35 micron), and balance jet milled powders (with an average particle size of about 2.3 microns), and a portion 2: 100% jet milled powders, the portion 1 was placed in the middle region of the magnet as 30 wt. % of the whole magnet while portion 2 was placed at both side regions as 35 wt. % of the whole magnet to form a laminated microstructure magnet. The average flexural strength value of the laminated $Sm_2Co_{17}$ type $Sm_2(CoFeCuZr)_{17}$ sintered magnets were enhanced by 62% (about 185 MPa) relative to a flexural strength value of about 114 MPa for the commercial magnet. Excellent magnetic properties were maintained in the laminated magnet. The values of $(BH)_{max}$ $B_r$ and $H_{ci}$ of the laminate magnet and commercial type reference magnet were, 26 MGOe; 26 MGOe; 10.6 kGs, 10.6 kGs; 34.0 kOe, 32.7 kOe, respectively. There was no decrease of $(BH)_{max}$ and $B_r$ values while an even slightly increased $H_{ci}$ by 4% for the laminated magnet made with the modified microstructures pursuant to the invention compared with those of the commercial counterpart magnet. Novel laminated coarse/fine/coarse grain microstructural architecture was formed in this magnet. The $Sm_2O_3$ submicron particles were well dispersed within the middle region of magnet matrix, which has a finer average grain size of about 22 micron while the fine grain area was about 30 wt. % of the magnet. The two coarse grain side regions had an average grain size of about 34 micron and each of the coarse grain areas was about 35 wt. % of the magnet. Whereas, the average grain size of the commercial counterpart magnet was about 45 microns.

It should be mentioned that, there are always about 0.5 wt. % $Sm_2O_3$ microparticles with an average particle size of about 2.5-3.5 microns in the commercial sintered Sm—Co magnets while the agglomerates of a few of these $Sm_2O_3$ microparticles are also commonly observed. These $Sm_2O_3$ microparticles are "naturally" formed through a partial oxidization during the multi-step magnet fabrication processes, especially during the powder fabrication and handling processes, sintering and heat treatment processes. Whereas, the $Sm_2O_3$ microparticles are smaller (with an overall average particle size of about 0.5-2.3 microns) while better dispersed in the artificially $Sm_2O_3$—added Sm—Co sintered magnets. The artificially added $Sm_2O_3$ submicron particles are insoluble, chemically stable, and non-reactive with the Sm—Co magnet matrix. These $Sm_2O_3$ submicron particles, whose average particle size is about 0.35 μm, maintain their original fine particles in the sintered Sm—Co magnets.

The results shown in both the first and second embodiments of the invention indicate that the purposeful addition of a small amount of well-dispersed $Sm_2O_3$ fine submicron particles into the magnet matrix reduced effectively the grain sizes of the $Sm_2Co_{17}$ type sintered magnets. Accordingly, adding a small amount of $Sm_2O_3$ fine particles can be an economical and effective method to mechanically strengthen the magnets due to the formation of a refined grain microstructure while maintaining or little degrading magnetic properties for the Sm—Co sintered magnets.

For purposes of further illustration of the third illustrative embodiment of the invention, using a feedstock of 100 wt. % modified finer $Sm_2Co_{17}$ type particle powders (average particle size of about 1.3 micron (within a preferred range of 0.1 to less than 1.5 microns) made from further cryomilling of the commercial jet-milled Sm—Co microparticle powders (average particle size of about 2.3 microns), the average flexural strength values of $Sm_2Co_{17}$ type $Sm_2(CoFeCuZr)_{17}$ sintered magnets were enhanced by about 96% (about 223 MPa) while the highest flexural strength value of about 244 MPa for selected specimens that was enhanced by about 114%. These are relative to a flexural strength value of 114 MPa for the commercial counterpart magnet made using 100% commercial jet milled powders. Excellent magnetic properties were maintained with the maximum energy product $(BH)_{max}$ (about 25 MGOe) decreased by only 3.8% (less than 4%) while with a degraded squareness on the $2^{nd}$ quadrant of demagnetization curve and an increased $B_r$ value (about 10.9 kGs), and almost no decrease of $H_{ci}$ value (about 32.2 kOe) respectively. These are relative to the values of $(BH)_{max}$ (about 26 MGOe), $B_r$ (about 10.6 kGs), and $H_{ci}$ (about 32.7 kOe) for the commercial counterpart magnet. The average grain size of the $Sm_2Co_{17}$ type sintered magnets made from cryomilled finer feedstock powder was about 15 μm with a single-modal grain size distribution. There were about 0.65 wt. % well-dispersed $Sm_2O_3$ microparticles with an average particle size of about 1.5 μm in the refined grain magnet. Whereas, the average grain size of the commercial counterpart magnet was about 45 microns. There were about 0.5 wt. % $Sm_2O_3$ microparticles with an average particle size of about 3.4 μm in the commercial sintered Sm—Co magnets while the agglomerates of a few of these $Sm_2O_3$ microparticles were commonly observed.

In the three further illustrative embodiments just discussed, the Sm—Co bulk sintered magnets have either a homogenous or heterogeneous laminated coarse/fine grain microstructure. Other heterogeneous grain structures, such as tri-modal grain structure, multi-modal grain structure, gridded fine/coarse grain structure (i.e. square honeycomb fine/coarse grain structure), gradient grain structures, (such as having larger grains progressing to smaller grains from one side to another side across the microstructure, or having larger grains progressing to smaller grains those are in the central areas and then progressing to larger grains, from one side to another side across the microstructure, or verse versa), or other refined microstructural heterogeneity and configurations, can also be produced in the REPMs using the feedstock and production process thereof developed in this invention. On the other hand, besides the powder metallurgy processing, the grain-refined structures can also be introduced into the REPMs by other fabrication methods including, but not limited to, hot pressing, die-upset, friction consolidation extrusion, hot extrusion, 3D printing, surface mechanical attrition treatment (SMAT), equal channel angular extrusion (ECAE), hot accumulative roll bonding (ARB), hot asymmetric rolling, high pressure torsion (HPT), hot drawing, mechanical milling, etc.

DETAILED DESCRIPTION OF THE INVENTION

Figure 1:
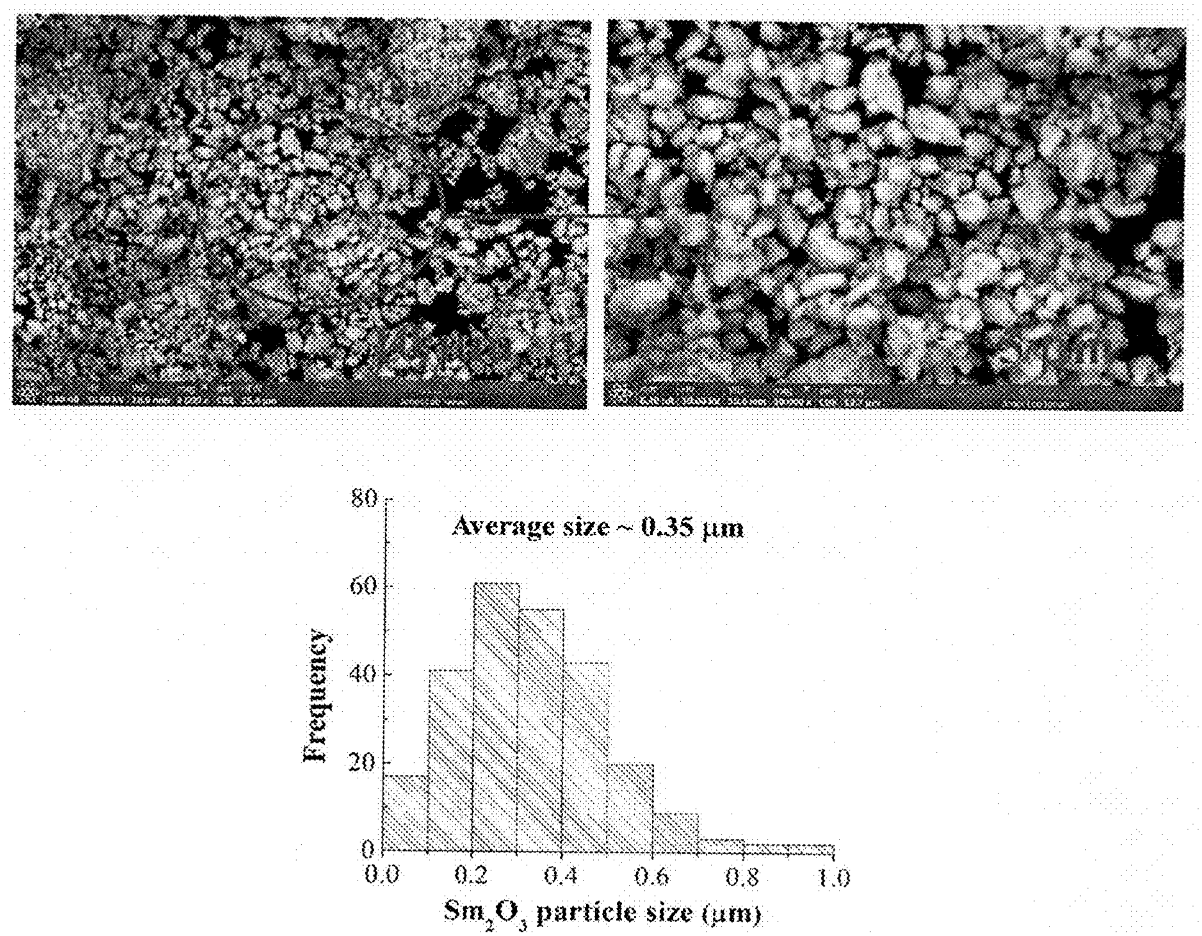
FIG. 1 shows morphology (SEM images) and corresponding particle size distribution of $Sm_2O_3$ submicron powders made by cryomilling in immersed $LN_2$ for 2 hrs (5000×, shown in the left image), according to one embodiment of the invention. The right column is the corresponding enlarged image (10,000×) from the selected area (marked by the red oval). The average particle size was about 0.35 μm. These and other particle size measurements and results described herein were obtained from the SEM images of the particles analyzed by the Image J software.

Embodiments of the present invention relates to rare earth permanent magnets (REPMs) having a sufficiently refined grain microstructure to provide significantly enhanced toughness; i.e. resistance-to-fracture as evidenced by enhanced mechanical toughness property such as flexural strength and/or fracture toughness, while maintaining or with a minimum sacrifice in the hard magnetic properties, and the method of their manufacture. Embodiments of the present invention can be employed to make REPMs that include, but are not limited to, Sm—Co, Nd—Fe—B and other REPMs.

The REPMs made pursuant to certain embodiments of the invention have refined homogeneous or heterogeneous grain microstructures. To increase flexural strength and/or fracture toughness of the REPMs, the sufficiently refine grain structures were achieved in one embodiment by introducing a small amount of fine-sized, insoluble, chemically stable, and non-reactive additive particle material into the magnet matrix, such as, carbides, fluorides, nitrides, oxides, sulfides, and/or their mixtures, or, alternatively, by using feedstock powders with finer particle sizes than that of conventional ones.

For purposes of the present invention, the carbide-based additive particle material can include, but is not limited to: $B_4C$, $BC_3$, $BaC_2$, $Be_2C$, $Al_4C_3$, $CaC_2$, $CeC_2$, $Cr_3C_2$, $Cr_4C$, $Cr_8C_2$, $Fe_3C$, $LaC_2$, $Li_2C_2$, $Mo_2C$, MoC, $Mn_3C$, SiC, $SrC_2$, TaC, ThC, TiC, $U_2C_3$, WC, (W,Ti)C, $W_2C$, $YC_2$, ZrC, $ZrC_2$, or a combination of any of these materials. The fluoride-based additive particle material can include, but is not limited to: $AcF_3$, $AlF_3$, $AuF_7$, $AuF_3$, $AuF_5$, AuF, $BaF_2$, $BeF_2$, $BiF_5$, $BiF_3$, BF, $BF_3$, $CdF_2$, $CaF_2$, $CeF_3$, $CrF_6$, $CrF_5$, $CrF_4$, $CrF_3$, $CrF_2$, $CoF_2$, $CoF_3$, CuF, $CuF_2$, $DyF_3$, $GaF_3$, $FeF_2$, $FeF_3$, $GeF_2$, $HfF_4$, $InF_3$, $IrF_6$, $KAlF_4$, $K_3CuF_6$, $K_2NiF_6$, $LaF_3$, LiF, LiBeF, LiNaKF, $MgF_2$, $MnF_2$, $MnF_3$, $MnF_4$, $Hg_2F_2$, $HgF_2$, $HgF_4$, $MoF_6$, $MoF_4$, $MoF_4$, $NdF_3$, $NiF_2$, $NbF_4$, $NbF_5$, $OsF_6$, $OsF_5$, $PF_5$, $PF_3$, $PbF_2$, $PbF_4$, $PdF_2$, $PdF_4$, $PdF_3$, $PtF_6$, $PtF_5$, $PtF_4$, $ReF_7$, $ReF_6$, $RhF_3$, $RuF_6$, $SbF_5$, $SbF_3$, $SmF_3$, $SnF_2$, $SnF_4$, $TaF_5$, $TeF_6$, $TeF_4$, TiF4, $TiF_3$, $TiF_3$, $UF_4$, $VF_5$, $VF_4$, $VF_3$, $WF_6$, $WF_5$, $WF_4$, $WOF_4$, $YbF_3$, $ZnF_2$, $ZrF_4$, or a combination of any of these additive materials. The nitride-based additive particle material can include, but not limited to: AlN, $Ag_3N$, BN, $Li_3N$, $(CN)_2$, $Cu_3N$, $Fe_2N$, $Fe_4N$, $Fe_{16}N_2$, GaN, $Hg_3N_2$, InN, $M_3N_2$ (M=alkaline-earth metals: Ba, Be, Ca, Mg, Sr, Ra), $Na_3N$, NbN, $P_3N_5$, $S_2N_2$, $S_4N_4$, ScN, $Se_4N_4$, $Si_3N_4$, TaN, $Ta_2N$, $Ta_3N_5$, TiN, TiAlN, TiCN, $Tl_3N$, $W_2N$, WN, $WN_2$, YN, VN, $Zn_3N_2$, ZrN, or a combination of any of these additive materials. The oxide-based additive particle material can include, but is not limited to: $Ac_2O_3$, $Ag_2O$, $Al_2O_3$, $Al_{18}\mathbf{13}_4O_{33}$, $Al_6BeO_{10}$, $Al_2MgO_4$, $Au_2O$, $Au_2O_3$, BaO, BeO, $Bi_2O_3$, $Bi_2O_5$, $B_2O_3$, CaO, $Ce_2O_3$, $CeO_2$, CdO, COO, CrO, $Cr_2O_3$, $CrO_2$, $CrO_3$, $Co_2O_3$, $Cs_2O$, $Cu_2O_5Yb_2$, $CuFe_2O_4$, $Cu_2O$, CuO, $Dy_2O_3$, $Er_2O_3$, $Eu_2O_3$, $Fr_2O$, $Gd_2O_3$, GaO, $Ga_2O_3$, GeO, $GeO_2$, $HfO_2$, $In_2O$, InO, $In_2O_3$, $Ir_2O_3$, $Fe_3O_4$, FeO, $Fe_2O_3$, $Hg_2O$, HgO, $K_2O$, $K_2MnO_4$, $K_2Ti_6O_{13}$, $La_2O_3$, $Li_2O$, $Lu_2O_3$, $Mg_2B_2O_5$, MgO, $Mn_3O_4$, MnO, $Mn_2O_3$, $MnO_2$, $Mn_2O_5$, $Mn_2O_7$, $MoO_2$, $Mo_2O_5$, $Na_2O$, $Nd_2O_3$, $NiFe_2O_4$, NiO, $Ni_2O_3$, $Nb_2O_3$, $Os_2O_3$, $OsO_3$, $OsO_4$, PbO, $PbO_2$, PdO, $PdO_2$, $Pr_6O_{11}$, $Pt_3O_4$, PtO, $Pt_2O_3$, $PuO_2$, $Pu_2O_5$, RaO, $Rh_2O_3$, $Rb_2O$, $RuO_2$, $RuO_4$, $Sb_2O_5$, $Sc_2O_3$, $Se_3O_4$, $SiO_2$, $Sm_2O_3$, SnO, $SnO_2$, SrO, $Ta_2O_3$, $Ta_2O_5$, $Tb_4O_7$, TcO, TiO, $Ti_2O_3$, $TiO_2$, $Tl_2O_3$, $Tm_2O_3$, $U_2O_5$, VO, $V_2O_3$, $VO_2$, $V_2O_5$, $VOCl_2$, $Yb_2O_3$, $WCl_2O_2$, $W_2O_3$, $WO_2$, $W_2O_5$, $YBa_2Cu_3O_7$, $Y_2O_3$, ZnO, $ZrO_2$, or combinations of any of these additive materials. The sulfide-based additive particle material can include, but is not limited to: $Al_2S_3$, $Ag_2S$, $As_2S_3$, BaS, BeS, $Bi_2S_3$, $B_2S_3$, CdS, CaS, CeS, $Ce_2S_3$, $Cr_2S_3$, CoS, $CoS_2$, $Cu_2S$, CuS, $Dy_2S_3$, $Er_2S_3$, EuS, $Gd_2S_3$, $Ga_2S_3$, GeS, $GeS_2$, $HfS_2$, $Ho_2S_3$, $In_2S$, InS, FeS, $FeS_2$, $La_2S_3$, $LaS_2$, $La_2O_2S$, $Li_2S$, MgS, MnS, HgS, $MoS_2$, $Na_2S$, $Nd_2S_3$, NiS, NdS, $K_2S$, PbS, $Pr_2S_3$, $Sb_2S_3$, $Sm_2S_3$, $Sc_2S_3$, $SiS_2$, SnS, $SnS_2$, SrS, $Tb_2S$, $ThS_2$, $Tm_2S_3$, $TiS_2$, $US_2$, $V_2S_3$, WS, $WS_2$, $Yb_2S_3$, $Y_2S_3$, $Y_2O_2S$, ZnS, and $ZrS_2$, or a combination of any of these additive materials.

For purposes of illustration and not limitation, one exemplary feedstock comprises of 99.5-90 wt. % commercial jet-milled Sm—Co or Nd—Fe—B microparticle powders (average particle size of about 2.3-5 μm), and 0.5-10 wt. % fine-sized additive particle material comprising for example, $Sm_2O_3$ or $Nd_2O_3$ particles with an average particle size of about 0.3-1 μm wherein the particle size measurements described here and elsewhere in this application were obtained from the SEM images of the particles analyzed by the Image J software. As a result, practice of the invention can be easily integrated with the current industry production line for sintered REPMs.

In certain embodiments, the powders can be mixed together under nitrogen, argon or other non-reactive atmosphere in a mixer or mill for greater than 0 to 1 hours or more as needed. The powders can be formed into a green compact and consolidated by techniques that include, but are not limited to, powder metallurgy processing, hot pressing, friction consolidation extrusion, hot extrusion, 3D printing, surface mechanical attrition treatment (SMAT), equal channel angular extrusion (ECAE), hot accumulative roll bonding (ARB), hot asymmetric rolling, high pressure torsion (HPT), hot drawing, and mechanical milling. The REPMs with refined grain microstructures pursuant to embodiments of the invention can maintain the hard magnetic properties without substantial degradation of the hard magnetic properties such as $(BH)_{max}$, $H_{ci}$ and $B_r$. The tough REPMs will be more robust for energy applications and can be less dependent on the critical element resources.

The following examples are offered for purposes of further illustration, but not limitation, with respect to the present invention:

Dry samarium (III) oxide powder ($Sm_2O_3$, Alfa Aesar, REacton®, 99.99% (REO), Stock No. 11230-14) after cryomilled for 2 hrs in $LN_2$ with a SPEX 6875 Freezer/Mill were composed of fine irregular particles with a particle size mainly in the range of about 0.1-0.5 μm and an average particle size of about 0.35 μm and few-sharp edges, as shown in FIG. 1. The dry samarium oxide microparticle powders to be cryomilled were first sealed in a polycarbonate grinding vial under either gaseous Ar or $N_2$ atmosphere inside of a glove box, an Ar glove box being used for the examples. The entire cryomilling process was conducted with the grinding vial immersed in liquid nitrogen ($LN_2$) on the SPEX 6875D Freezer/Mill, which has a $LN_2$ tank that is connected to a dewar container as a continuous $LN_2$ source. The cryomilling cycle sequence was cryomilling for 10 minutes and then pausing for 2 minutes to cool down the powders. Ten (10) such cryomilling cycle sequences were applied in this and the other examples herein, the total multiple-cycle cryomilling time being 2 hours excluding the pause times.

Figure 2:
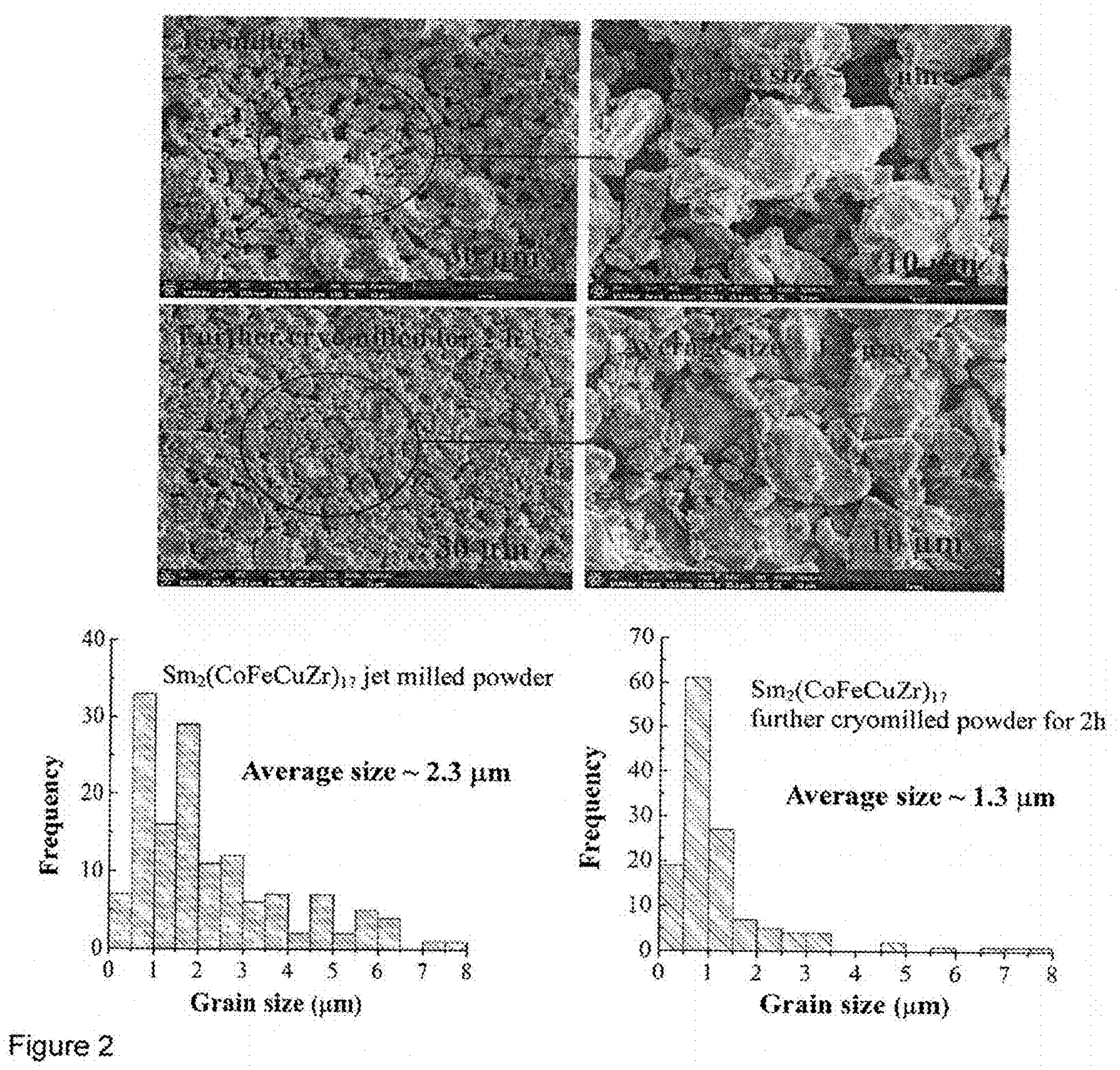
FIG. 2 shows morphology (SEM images) and corresponding particle size distributions of $Sm_2Co_{17}$ type $Sm_2(CoFeCuZr)_{17}$ jet milled powder (1500×, shown in top row) and further cryomilled powder in $LN_2$ for 2 hrs (shown in bottom row), according to one embodiment of the invention. The right column is the corresponding enlarged images (5000×) from the selected areas (marked by the red ovals). The average particle sizes were about 2.3 μm and 1.3 μm for the jet milled powder and cryomilled powder, respectively.

The overall particle size range of the $Sm_2O_3$ cryomilled powders was within about 0.05-1 μm. The $Sm_2Co_{17}$ type $Sm_2(CoFeCuZr)_{17}$ conventional jet milled powders were composed of irregular microparticles with a particle size mainly in the range of about 0.7-3.0 μm and an average particle size of about 2.3 μm, as shown in FIG. 2. The overall particle size range of the jet milled powders was within about 0.7-8 μm. However, the $Sm_2(CoFeCuZr)_{17}$ powders further cryomilled for 2 hrs were composed of finer irregular microparticles with a particle size mainly in the range of about 0.5-1.5 μm and an average particle size of about 1.3 μm and few sharp edges. The overall particle size range of the cryomilled powders was within about 0.5-8 μm (see FIG. 2). These particle size results were obtained from the SEM images analyzed by image J software. Both the jet milled microparticles and the further cryomilled finer Sm—Co particles had a single-crystal structure.

Besides cryomilling in liquid nitrogen, the other finer powder preparation methods wherein the particle size ranging from nanometer, submicron, and micron scale or their mixtures, that is smaller than that of commercial jet-milled powders (that have a typical average particle size of about 2.3-5 micron), include but are not limited to, some top-down and bottom-up approaches, such as, multiple-cycle jet milling in nitrogen ($N_2$) gas atmosphere, low or high energy ball milling at room temperature in inert gas (Ar, $N_2$, or He) or in solvent media (acetone, ethanol, hexane, heptane, toluene, etc.), surfactant-assisted high energy ball milling at room temperature or immersed in the liquid nitrogen, inert gas atomization, gas condensation, spark erosion, chemical precipitation, sol-gel, pyrolysis and hydrothermal synthesis, thermal decomposition, plasma arcing, chemical reduction or oxidization, gas-solid reaction, vapor-liquid-solid (VLS) process, carburizing, carbonitriding, nitriding, chemical vapor deposition (CVD), physical vapor deposition (PVD), hydrogen decrepitation (HD), hydrogen decrepitation deabsorbation recombination (HDDR) process, severe plastic deformation (SPD), electrodeposition, colloidal lithography, atomic layer deposition (ALD), etc.

The cryomilled $Sm_2O_3$ sub-micron powders produced in this invention were then mixed with the jet milled precursor powders under a nitrogen atmosphere in a SPEX 8000M Mixer/Mill without any milling balls for a time of 7 minutes, which more generally can be up to 15 minutes or more or other suitable blending time. The particle mixtures then are subjected to conventional powder metallurgy method (i.e. pressing to form a compact, sintering the pressed compact followed by solution heat treating, tempering, and aging) to produce a bulk magnet with grain size and grain boundary engineering or modified microstructural architectures.

The particular illustrative powder metallurgy steps typically include cold compaction of the magnetically aligned powder mixture to form a green compact and then sintering the green compact, although the powders can be formed into a green compact and consolidated by techniques that include, but are not limited to, powder metallurgy processing, hot pressing, friction consolidation extrusion, hot extrusion, 3D printing, surface mechanical attrition treatment (SMAT), equal channel angular extrusion (ECAE), hot accumulative roll bonding (ARB), hot asymmetric rolling, high pressure torsion (HPT), hot drawing, and mechanical milling. The powder metallurgy method optionally can include preparation of ingot chips by strip casting or bulk ingot by induction melting or arc melting, hydrogen decrepitation (HD) or crushing into coarse powders of about 200-500 μm or less sizes, jet milling or ball milling into fine microparticles of the average particle sizes described above, magnetically aligning by a 4 or 7 Tesla pulsed magnetic field and pre-pressing powder mixtures into green compacts by a pressure of 35,000 psi (about 241 MPa) or higher using a Nikisso CL15-45-30 iso-static press, and subsequent heat treatment procedure, including sintering, solution, temper, and aging.

In the examples and results described above and below, the green compacts were pre-pressed by a pressure of 241 MPa using the above Nikisso CL15-45-30 iso-static press and sintered. The 2:17 type $Sm_2(CoFeCuZr)_{17}$ were sintered at 1190-1250° C. for 1-2 hrs, solution tempered at 1150-

1185° C. for 1-7 hrs, and aged at 800-850° C. for 5-10 hrs then cooling to 400° C. at a ramp rate of 0.7-1.0° C./min., further aging at 400° C. for 1-10 hrs.

Figure 3:
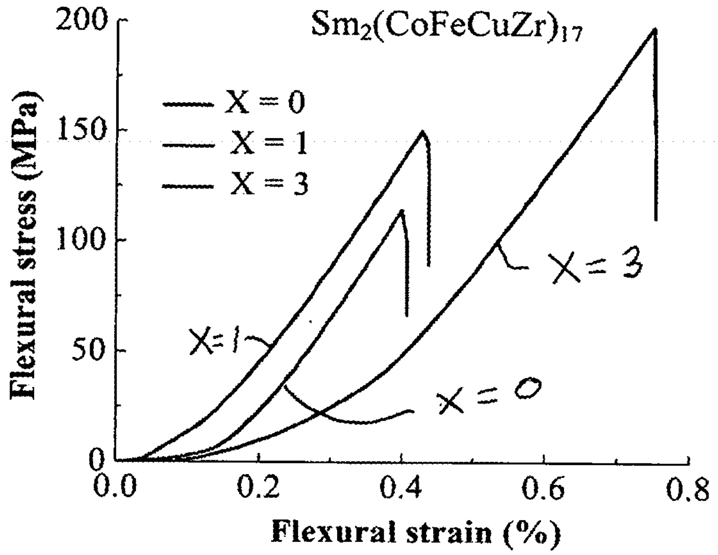
FIG. 3 presents typical flexural stress-strain curves for selected $Sm_2O_3$—added $Sm_2(CoFeCuZr)_{17}$ sintered magnets made from the feedstock of (100-x) wt. % jet milled powders+x wt. % (x=0, 1, 3) $Sm_2O_3$ cryomilled submicron powders, according to an embodiment of the process of the invention. The highest flexural strength value of about 199 MPa was achieved for selected specimen with the addition of x=3 wt. % $Sm_2O_3$ submicron particles that was enhanced by about 75%.

FIG. 3 shows the typical flexural stress-strain curves for selected $Sm_2O_3$-added $Sm_2(CoFeCuZr)_{17}$ sintered magnets made from the feedstock of (100-x) wt. % jet milled powders+x wt. % (x=0, 1, 3) $Sm_2O_3$ cryomilled submicron powders. By engineering the grain size and grain-boundary microstructure, the average flexural strength values of the sintered $Sm_2Co_{17}$ type magnets were enhanced by about 30% and 62% (about 148 MPa and 185 MPa for the samples with x=1 and 3 wt. %, respectively) compared to that of 114 MPa for the reference sample with x=0. Whereas, the highest flexural strength value of about 199 MPa was achieved for selected specimens with the addition of x=3 wt. % $Sm_2O_3$ submicron particles that was enhanced by about 75%. Flexural strength values reported above were measured using the 3-point bending ASTM flexure test no. C1161-13. Fracture toughness, another mechanical toughness property, can be measured by the Charpy V-notch or IZOD ASTM tests no. C1421-16.

Figure 4:
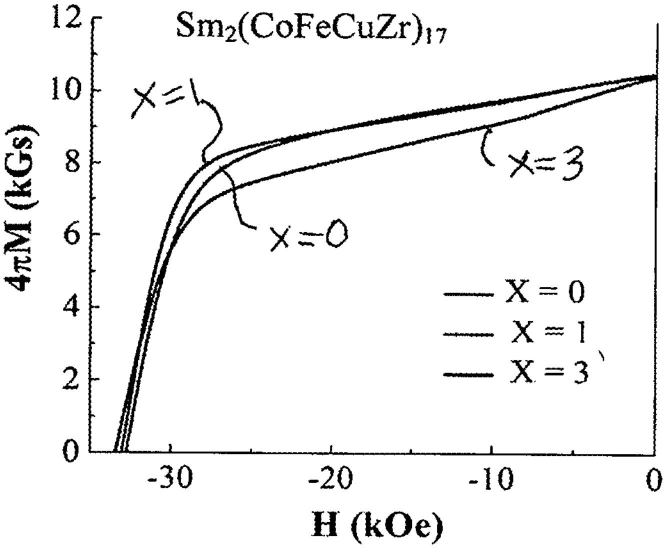
FIG. 4 presents demagnetization curves of selected $Sm_2O_3$—added $Sm_2(CoFeCuZr)_{17}$ sintered magnets made from the feedstock of (100-x) wt. % jet milled powders+x wt. % (x=0, 1, 3) $Sm_2O_3$ cryomilled submicron powders, according to an embodiment of the process of the invention.

Demagnetization curves are shown in FIG. 4 for the $Sm_2(CoFeCuZr)_{17}$ sintered magnets made from the feedstock of (100-x) wt. % 2:17 type jet milled (JM) powders+x wt. % (x=0, 1, 3) $Sm_2O_3$ cryomilled submicron particle powders. Excellent hard magnetic properties were maintained with the maximum energy product $(BH)_{max}$ values of about 26 MGOe, 26 MGOe, and 24.5 MGOe for the $Sm_2(CoFeCuZr)_{17}$ sintered magnets added with x=0, 1, and 3 wt. % $Sm_2O_3$ submicron particles, respectively. $(BH)_{max}$ decreased (about 24.5 MGOe) by only about 5.8% (less than 6%) for the magnet with the addition of x=3 wt. % $Sm_2O_3$ while no decrease of $(BH)_{max}$ for the magnet with the addition of 1 wt. % $Sm_2O_3$. There was almost no decrease of remanence $B_r$ values, those were about 10.6 kGs, 10.6 kGs, and 10.5 kGs for the $Sm_2(CoFeCuZr)_{17}$ sintered magnets with the addition of 0, 1, 3 wt. % $Sm_2O_3$ submicron particles, respectively. The intrinsic coercivity $H_{ci}$ values were about 32.7 kOe, 32.9 kOe, 33.4 kOe for the $Sm_2(CoFeCuZr)_{17}$ sintered magnets with the addition of 0, 1, 3 wt. % $Sm_2O_3$ submicron particles, respectively. The $H_{ci}$ values were slightly increased for the $Sm_2O_3$—added magnets due to the grain refinement with the addition of $Sm_2O_3$ submicron particles. The density ρ of these $Sm_2(CoFeCuZr)_{17}$ sintered magnets with the addition of 0, 1, 3 wt. % $Sm_2O_3$ was about 8.4 g/cc, which was about 99% of the theoretical value.

Figure 5:
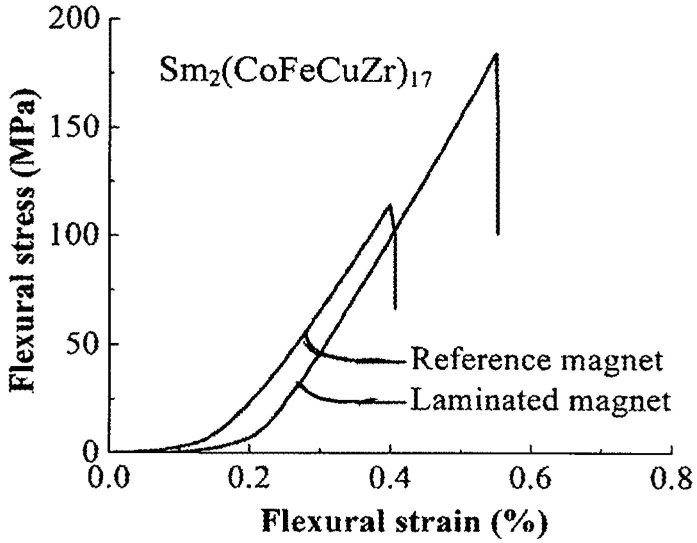
FIG. 5 illustrates typical flexural stress-strain curves for laminated coarse/fine/coarse grain $Sm_2(CoFeCuZr)_{17}$ sintered magnets (ie. laminated magnet) made from the feedstock of a well-mixed mixture of 97 wt. % jet milled powders+3 wt. % $Sm_2O_3$ cryomilled submicron powders as 30 wt. % of the magnet that was put in the middle region of magnet while 35 wt. % of jet milled powder was put at each of both side regions of the magnet, according to an embodiment of the process of the invention. As a comparison, a typical flexural stress-strain curve of commercial type magnet (ie. reference magnet) with a single modal coarse grain distribution made from 100 wt. % jet milled powder was also shown in FIG. 5.

FIG. 5 shows typical flexural stress-strain curves for laminated coarse/fine/coarse grain $Sm_2(CoFeCuZr)_{17}$ sintered magnets made from the feedstock of a well-mixed mixture of 97 wt. % jet milled powders+3 wt. % $Sm_2O_3$ cryomilled submicron particle powders as 30 wt. % of the magnet that was put in the middle region of magnet. Whereas, 35 wt. % of 100% jet milled powder was put at each of both side regions of the magnet. By engineering the grain size, grain-boundary and microstructural architecture, the average flexural strength values of the laminated $Sm_2(CoFeCuZr)_{17}$ sintered magnets were enhanced by 62% (about 185 MPa) relative to a flexural strength value of 114 MPa for the commercial reference magnet.

Figure 6:
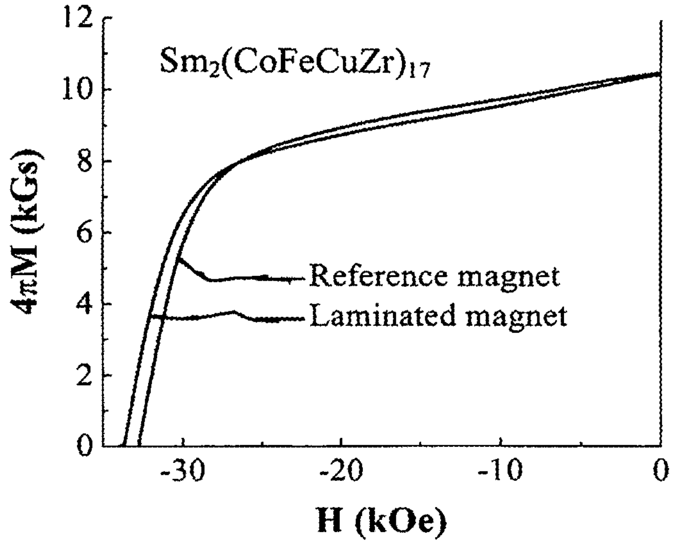
FIG. 6 illustrates typical demagnetization curve for laminated coarse/fine/coarse grain $Sm_2(CoFeCuZr)_{17}$ sintered magnets (ie. laminated magnet) made from the feedstock of a well-mixed mixture of 97 wt. % jet milled powders+3 wt. % $Sm_2O_3$ cryomilled submicron powders as 30 wt. % of the magnet that was put in the middle region of magnet, while 35 wt. % of jet milled powder was put at each of both side regions of the magnet, according to an embodiment of the process of the invention. As a comparison, a typical demagnetization curve of commercial type magnet (ie. reference magnet) made from 100 wt. % jet milled powder was also shown in FIG. 6.

FIG. 6 shows demagnetization curves of the laminated $Sm_2(CoFeCuZr)_{17}$ sintered magnets. Excellent magnetic properties were maintained in the laminated magnet. The values of $(BH)_{max}$ $B_r$ and $H_{ci}$ of the laminate magnet and commercial type reference magnet were, 26 MGOe; 26MGOe; 10.6 kGs, 10.6 kGs; 34.0 kOe, 32.7 kOe, respectively. There was no decrease of $(BH)_{max}$ and $B_r$ values while an even slightly increased $H_{ci}$ by 4% for the laminated magnet made with the modified microstructures pursuant to the invention compared with those of the commercial counterpart magnet. These $Sm_2(CoFeCuZr)_{17}$ sintered magnets have a density ρ of about 8.4 g/cc, which was about 99% of the theoretical value.

Figure 7:
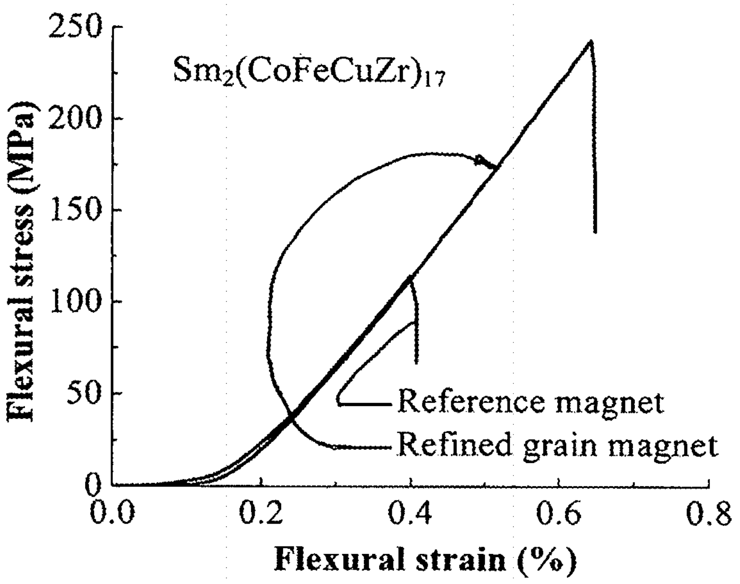
FIG. 7 shows typical flexural stress-strain curve of refined grain $Sm_2(CoFeCuZr)_{17}$ magnet (ie. refined grain magnet) made from 100 wt. % finer particle powder cryomilled in $LN_2$ for 2 hrs, according to an embodiment of the process of the invention. The highest flexural strength value of 244 MPa was achieved in this specimen that was enhanced by about 114%. As a comparison, a typical flexural stress-strain curve of commercial type magnet (ie. reference magnet) made from 100 wt. % jet milled powder with a flexural strength value of 114 MPa was also shown in FIG. 7.

FIG. 7 shows typical flexural stress-strain curves of refined grain $Sm_2(CoFeCuZr)_{17}$ magnet made from 100 wt. % finer particle powder cryomilled in $LN_2$ for 2 hrs and the commercial type magnet made from 100 wt. % jet milled powder. By engineering the grain size and grain-boundary microstructure, the average flexural strength value of $Sm_2(CoFeCuZr)_{17}$ sintered magnets made from 100 wt. % cryomilled powder was enhanced by about 96% (about 223 MPa) while the highest flexural strength value of about 244 MPa was achieved for the selected specimen, which was enhanced by about 114%, compared to 114 MPa for the commercial counterpart sample made from 100 wt. % jet milled powder.

Figure 8:
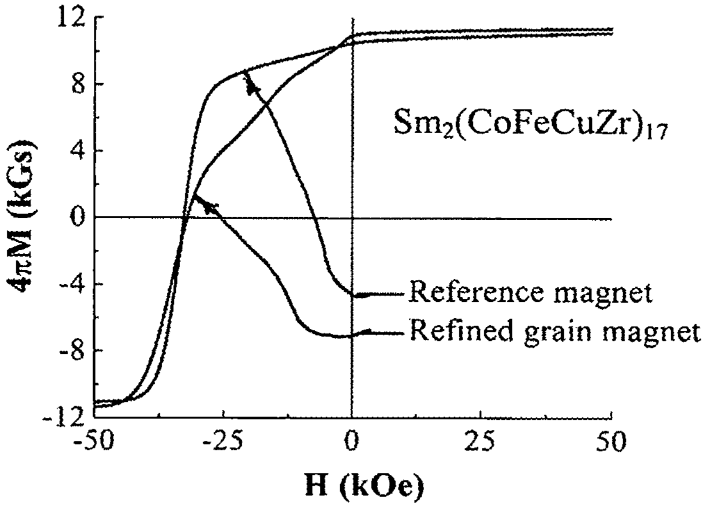
FIG. 8 shows demagnetization curves of refined grain $Sm_2(CoFeCuZr)_{17}$ magnet (i.e. refined grain magnet) made from 100 wt. % cryomilled powder in $LN_2$ for 2 hrs and the commercial type magnet made from 100 wt. % jet milled powder, according to an embodiment of the process of the invention. As a comparison, a typical demagnetization curve of commercial type magnet (ie. reference magnet) made from 100 wt. % jet milled powder was also shown in FIG. 8.

FIG. 8 shows demagnetization curves of the refined grain $Sm_2(CoFeCuZr)_{17}$ magnet made from 100 wt. % finer powder cryomilled for 2 hrs. Excellent magnetic properties were maintained with the maximum energy product $(BH)_{max}$ (about 25 MGOe) decreased by only 3.8% (less than 4%) while with a degrade squareness on the $2^{nd}$ quadrant of demagnetization curve while an increased $B_r$ value (about 10.9 kGs), and almost no decrease of $H_d$ value (about 32.2 kOe) respectively. These are relative to values of $(BH)_{max}$ (about 26 MGOe), $B_r$ (about 10.6 kGs), and $H_{ci}$ (about 32.7 kOe) for the commercial reference magnet. $Sm_2(CoFeCuZr)_{17}$ sintered magnet density ρ was about 8.4 g/cc, which was about 99% of the theoretical value.

Figure 9:
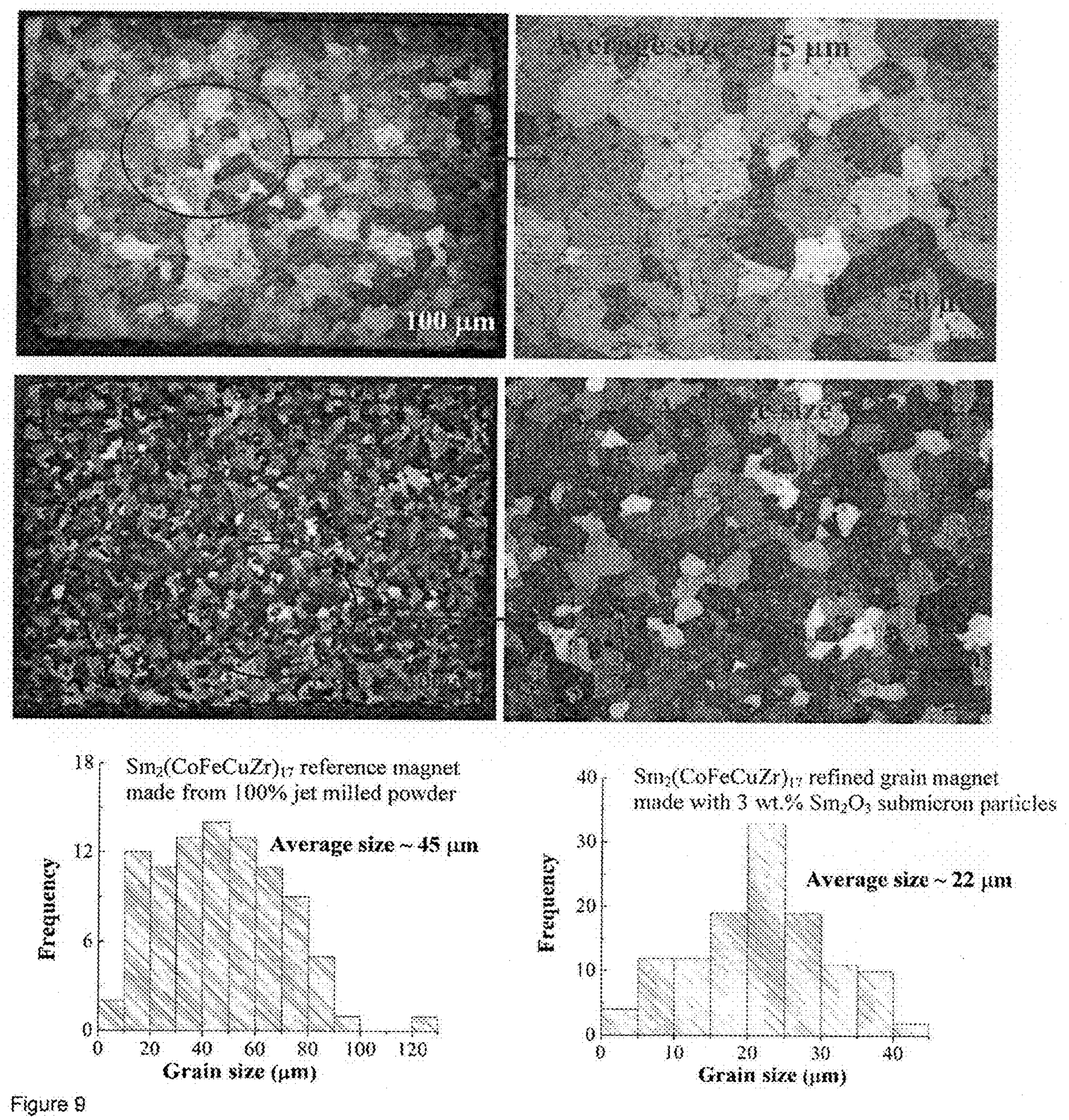
FIG. 9 shows morphology (optical photomicrographs, 100×, shown in the top left images) and corresponding grain size distribution (bottom images) of cross-section microstructures of selected $Sm_2O_3$—added $Sm_2(CoFeCuZr)_{17}$ sintered magnets made from the feedstock of (100-x) wt. % jet milled powders+x wt. % (x=0, 3) $Sm_2O_3$ cryomilled submicron particles. The right column is the corresponding enlarged images (400×) from the selected areas (marked by the red ovals). The average grain size was about 22 μm for the magnet with the addition of 3 wt. % $Sm_2O_3$ submicron particles. Whereas, the average grain size of the commercial counterpart magnet (x=0 wt. %) was about 45 μm. Both magnets have a single-modal grain size distribution. The specimens were mechanically polished then etched with 2% nital etchant for the metallographic examination. Grain size set forth herein and elsewhere in the specification were measured from optical images of the respective microstructures analyzed by Image J software.

With respect to sintered microstructures, a typical single-modal coarse grain size structure with an average grain size of about 45 μm was observed in the 2:17 type $Sm_2(CoFeCuZr)_{17}$ commercial-type sintered magnet made from 100 wt. % 2:17 type jet milled powders, as shown in FIG. 9. In contrast, the Sm—Co sintered magnets made from the mixture feedstocks of $Sm_2O_3$—submicron particles and jet milled magnet alloy powders pursuant to the invention have a refined single-modal grain size microstructure, as shown in FIG. 9. The average grain sizes of the $Sm_2O_3$—added sintered magnets were about 32 μm and 22 μm for the magnets with the addition of 1 wt. % and 3 wt. % $Sm_2O_3$ submicron particles, respectively. These grain size results were obtained from the optical images of the microstructures analyzed by Image J software. This refined grain sized microstructure resulted in considerably higher flexural strength and higher fracture toughness, and comparable magnetic properties, compared with the commercial reference magnet with a single-modal coarse grain sized microstructure as shown in FIG. 9. The fine grains acting as the strengthening sites can inhibit the crack nucleation and also slow down the propagation of micro-cracks, which in turn increasing magnet's flexural strength and fracture toughness.

Figure 10:
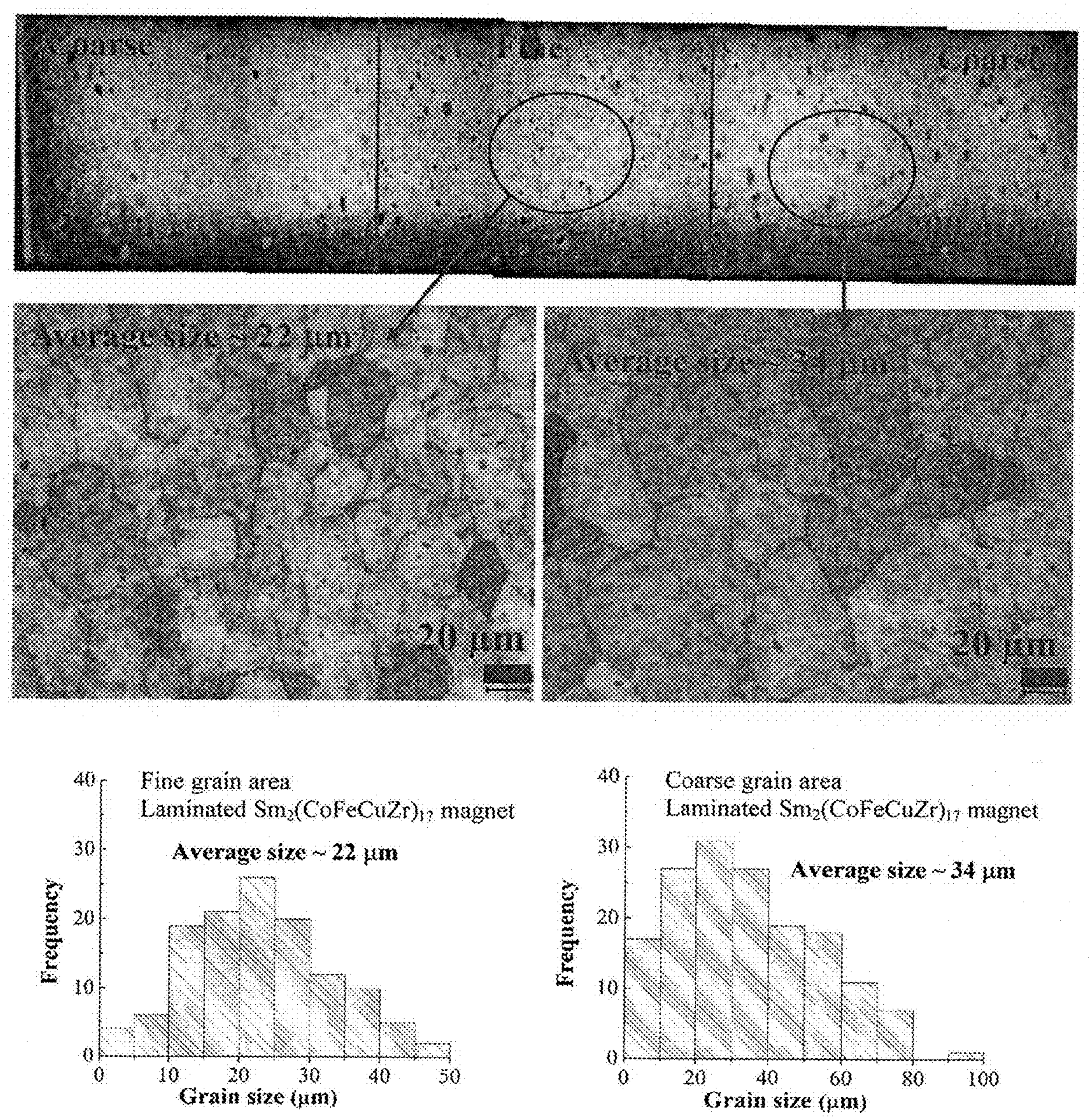
FIG. 10 shows morphology of cross-section microstructures (optical photomicrographs, 100×, shown in the top image) and corresponding grain size distribution (bottom images) from selected fine and coarse grain areas (marked by the red ovals) of the laminated coarse/fine/coarse grain $Sm_2(CoFeCuZr)_{17}$ sintered magnet. The middle column is the corresponding enlarged images (1000×) from the selected coarse and fine areas (marked by the red ovals), respectively. The magnet was made from the feedstock of a well-mixed mixture of 97 wt. % jet milled powders+3 wt. % $Sm_2O_3$ cryomilled submicron powders as 30 wt. % of the magnet that was put in the middle region of magnet while 35 wt. % of jet milled powder was put at each of both side regions of the magnet. Novel laminated coarse/fine/coarse grain microstructural architecture was formed in this magnet. The finer average grain size in the magnet central part was about 22 μm. The two coarse grain side regions had an average grain size of about 34 μm. Whereas, the average grain size of the commercial counterpart magnet was about 45 μm as shown in FIG. 9.

FIG. 10 shows morphology of cross-section microstructures and corresponding grain size distribution from selected fine and coarse regions of the laminated coarse/fine/coarse grain $Sm_2(CoFeCuZr)_{17}$ sintered magnet. The magnet was made from the feedstock of a well-mixed mixture of 97 wt. % jet milled powders+3 wt. % $Sm_2O_3$ cryomilled submicron powders as 30 wt. % of the magnet that was put in the middle region of magnet. The 35 wt. % of jet milled powder was put at each of both side regions of the magnet. Novel laminated coarse/fine/coarse grain microstructural architecture was formed in this magnet. The finer average grain size in the magnet central (middle) region was about 22 μm. The two coarse grain areas at each side region of the magnet had an average grain size of about 34 μm. Whereas, the average grain size of the commercial counterpart magnet was about 45 μm as shown in FIG. 9. The enhancement of flexural strength of the laminated Sm—Co sintered magnets resulted from the grain size refinement with the contributions from both localized finer grain central regions (about 30 wt. % of the magnet) and a general grain size reduction from the coarse grain matrix. The localized finer grain region is more effective in preventing or propagation via acting as strengthening sites than the coarser matrix.

Figure 11:
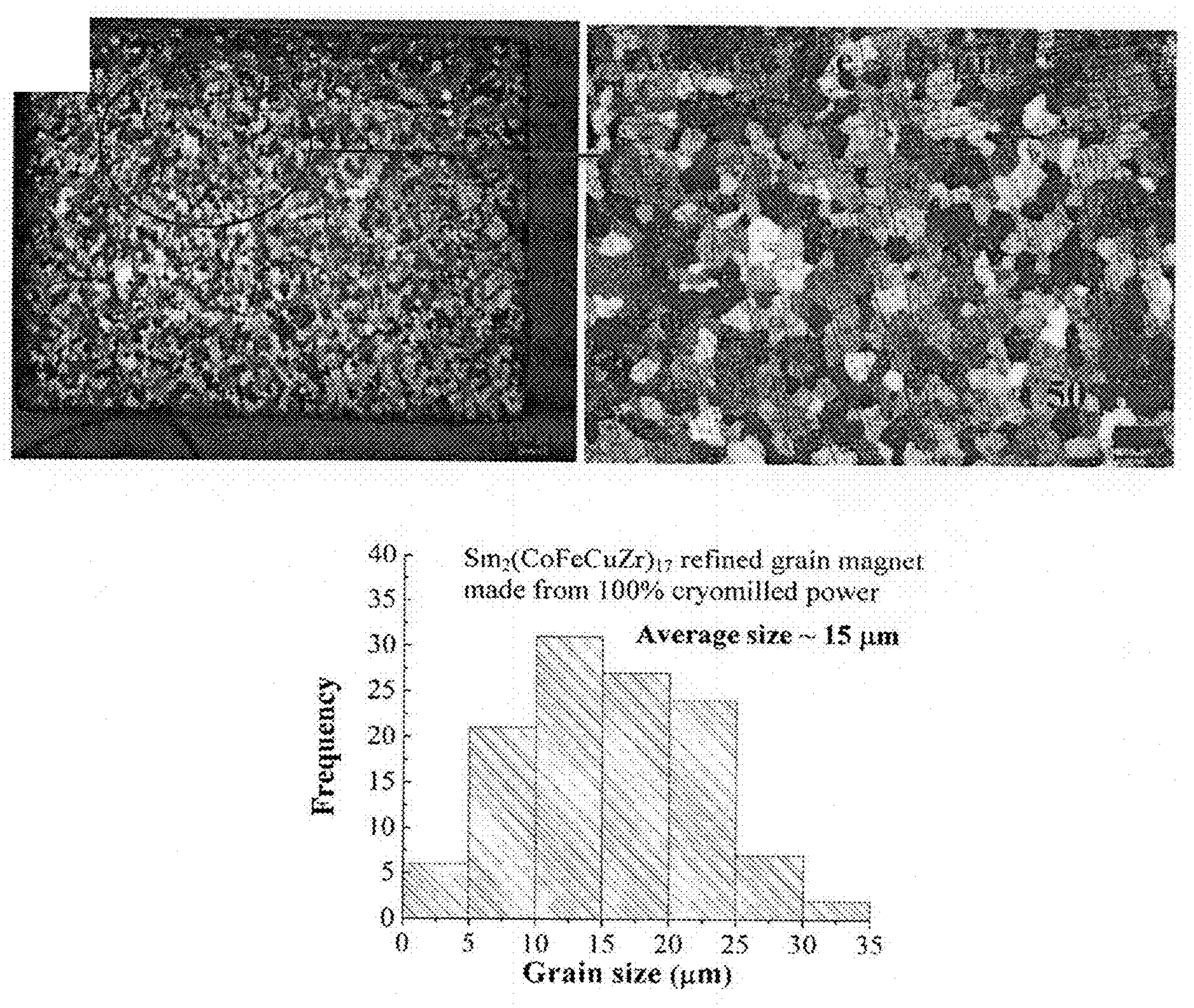
FIG. 11 shows morphology (optical photomicrographs, 100×, shown in the left image) and corresponding grain size distribution of cross-section microstructures of refined grain $Sm_2(CoFeCuZr)_{17}$ magnet made from 100 wt. % cryomilled powder in $LN_2$ for 2 hrs. The right column is the corresponding enlarged image (400×) from the selected area (marked by the red oval). The average grain size of the refined grain magnets was about 15 μm with a single-modal grain size distribution. The specimen was mechanically polished then etched with 2% nital etchant for the metallographic examination.
Figure 12:
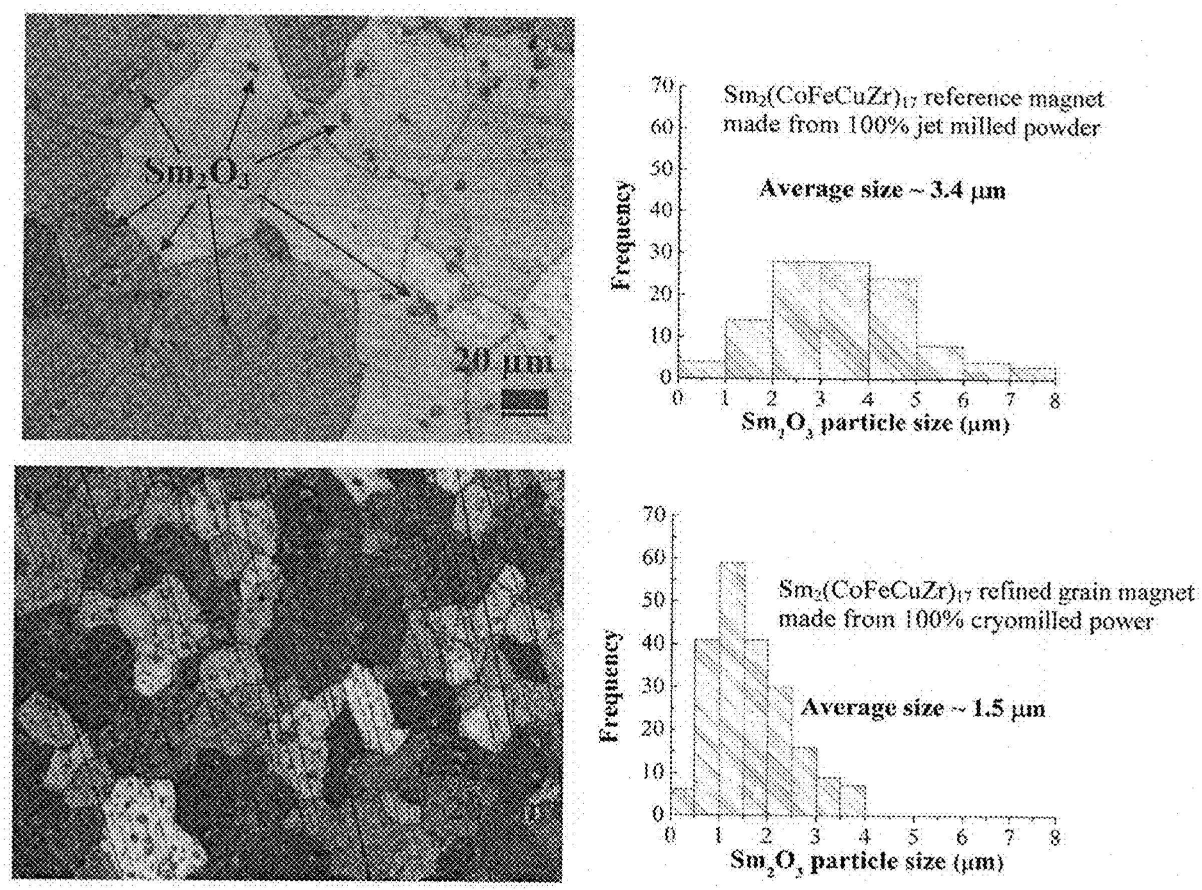
FIG. 12 shows morphology (optical photomicrographs, 1000×) and particle size distribution of $Sm_2O_3$ microparticles (in gray color) for the $Sm_2(CoFeCuZr)_{17}$ refined grain magnet (shown in the bottom image) and commercial reference magnet (shown in the top image) those also shown in FIGS. 9 and 11, respectively. These particle size results were obtained from the optical photomicrographs of the particles analyzed by the Image J software.

As shown in FIGS. 11 and 12, the average grain size of the $Sm_2(CoFeCuZr)_{17}$ sintered magnets made from 100 wt. % finer cryomilled feedstock powder was about 15 μm with a refined single-modal grain size microstructure. There were about 0.65 wt. % well-dispersed $Sm_2O_3$ microparticles with an average particle size of about 1.5 μm in this refined grain magnet. Whereas, the average grain size of the commercial counterpart magnet was about 45 μm. There were about 0.5 wt. % $Sm_2O_3$ microparticles with an average particle size of about 3.5 μm in the commercial sintered Sm—Co reference magnets while the agglomerates of a few of these $Sm_2O_3$ microparticles were also commonly observed. A higher volume fraction, a finer average particle size, and better-dispersion of $Sm_2O_3$ microparticles, which has larger pinning force, lead to finer grain size in the $Sm_2(CoFeCuZr)_{17}$ sintered magnets made from 100 wt. % finer cryomilled feedstock powder, compare to that of the commercial counterpart magnet. These $Sm_2O_3$ microparticles mentioned above are "naturally" formed through a partial oxidization during the multi-step magnet fabrication processes, especially during the powder fabrication and handling processes, sintering and heat treatment processes. It should be noticed that, this source of $Sm_2O_3$ microparticles is different with that of the well-controlled, artificially $Sm_2O_3$-added magnets, according to an embodiment of the process of the invention. There are two sources of $Sm_2O_3$ particles in the sintered magnet matrix. One source is the small amount (1 or 3 wt. %) of $Sm_2O_3$ submicron particles those being artificially added into the magnet matrix, which maintain their original fine particle size in the magnet matrix. The other is the "naturally" formed $Sm_2O_3$ micron scale particles through a partial oxidization during the magnet fabrication processes which is similar to the non-$Sm_2O_3$-added magnets.

Further experimental samples were made in accordance with the parameters set forth in the examples described above. These further samples comprised sintered $Sm(CoFeCuZr)_{17}$ that included 0.5 wt. % $Sm_2O_3$ submicron particles; 2 wt. % $Sm_2O_3$ submicron particles, and 0.5 wt. % $La_2O_3$ submicron particles, respectively, (where the $Sm_2O_3$ particles were 0.35 microns in average particle size and the $La_2O_3$ particles were 0.2 microns in average particle size). These further samples were tested for mechanical and magnetic properties as described above in the prior examples, and produced similar results in terms of similar mechanical improvements while maintaining their excellent magnetic properties.

For example, the average flexural strength values were enhanced by about 11%, 52%, and 45% (about 127, 173, and 165 MPa) for the $Sm_2(CoFeCuZr)_{17}$ sintered magnets added with x=0.5 and 2 wt. % of $Sm_2O_3$, and 0.5 wt. % of $La_2O_3$ submicron particles, respectively, compared to that of 114 MPa for the reference magnet with x=0. Excellent hard magnetic properties were maintained with $(BH)_{max}$ values of about 26, 26, 25, and 26 MGOe; $B_r$ values of about 10.6, 10.6, 10.5, and 10.6 kGs; $H_{ci}$ values of about 32.7, 32.5, 34.9, and 35.5 kOe for the $Sm_2(CoFeCuZr)_{17}$ sintered magnets added with x=0, 0.5, and 2 wt. % $Sm_2O_3$, and 0.5 wt. % of $La_2O_3$ submicron particles, respectively.

The magnets made pursuant to embodiments of the invention can be expected to find similar applications in various industries as those of commercial sintered, die-upset or bonded REPMs. Applications include, but are not limited to, e.g., telecommunication, magnetic storage, biomedical equipment, consumer electronics, sensors, power and propulsion applications such as high performance motors and generators and ion engines, inertial devices such as gyroscopes and accelerometers, and traveling wave tubes, and many more.

While exemplary embodiments of the present invention have been shown and described herein, it will be apparent to those skilled in the art that many changes and modifications may be made without departing from the invention in its true scope and broader aspects. The appended claims are therefore intended to cover all such changes and modifications as fall within the spirit and scope of the invention as set forth in the following claims.

Relevant literature references incorporated herein by reference include:

E. P. Wohlfarth, K. H. J. Buschow, Ferromagnetic materials, North Holland, 1988.

http://www.electronenergy.com/products/materials.

J. F. Liu, P. Vora, M. H. Walmer, E. Kottcamp, S. A. Bauser, A. Higgins, and S. Liu, Journal of Applied Physics, 97 (2005) 10H101.

W. Li, A. H. Li, H. J. Wang, W. Pan, H. W. Chang, Journal of Applied Physics,105 (2009) 07A703.

S. Q. Liu, J. F. Liu, US Patent Pub. No.: US 2005/0081960 A1

X. Y. Li, K. Lu, Nature Materials 16 (2017) 700.

X. L. Wu, M. X. Yang, F. P. Yuan, G. L. Wu, Y. J. Wei, X. X. Huang, and Y. T. Zhu, Proceedings of the National Academy of Sciences of the United States of America, 112 (2015) 14501.

Y. M. Wang, M. W. Chen, F. H. Zhou, E. Ma, Nature 419 (2002) 912.

P. F. Cesar, H. N. Yoshimura, W. G. Jr Miranda, C. L. Miyazaki, L. M. Muta, L. E. Rodrigues Filho, Journal of Biomedical Materials Research Part B Applied Biomaterials 78 (2006) 265.

L. C. Stearns, M. P. Harmer, Journal of the American Ceramic Society 79 (1996) 3020.

A. V. Karasev, H. Suito, ISIJ International 48 (2000) 658.

Jun Cui, Baozhi Cui, "Feedstock and heterogeneous structure for tough rare earth permanent magnets and production process therefor", US patent publication No. 2019/0115128 based on U.S. Ser. No. 16/350,215, filed Oct. 15, 2018.

What is claimed is:

1. A sintered rare earth permanent magnet comprising at least one region comprised of a sintered feedstock blend of rare earth alloy feedstock particles and artificially-added grain-refining submicron feedstock particles having an average particle size of less than 1 micron wherein the sintered feedstock blend provides a refined grain microstructure that includes a rare earth alloy magnet matrix and the artificially-added grain-refining submicron feedstock particles dispersed in the microstructure which has an average refined grain size from about 15 to less than 40 microns, wherein the at least one region having the refined grain microstructure provides the sintered magnet with at least one of mechanical toughness and/or mechanical strength beneficial for inhibiting micro-cracking of the magnet.

2. The magnet of claim 1 that exhibits a flexural strength increase of 30% or greater at 20° C. compared to a flexural strength of only about 114 MPa of a sintered rare earth counterpart magnet having an average grain size of about 45 microns with no reduction of at least one of $(BH)_{max}$, $B_r$ and $H_{ci}$ magnetic properties.

3. The magnet of claim 1 wherein the refined grain microstructure has an average grain size of about 22 to about 32 microns.

4. The magnet of claim 1 wherein the magnet has a heterogeneous grain structure that comprises regions having relatively fine grain size and coarse grain size wherein at least one of the regions has the sufficiently refined grain microstructure.

5. The magnet of claim 1 comprising represented by at least one of: R—cobalt including $RCo_5$ or $R_2Co_{17}$, R=rare earth, Lanthanum, or Yttrium; R-iron-boron including $R_2Fe_{14}B$ or R-TM-B, TM is selected from a group of transition metals consisting essentially of Fe, Co and other transition metal elements; R-TM-carbon including $R_2Fe_{14}C$; a R-TM-nitrogen including $R_2Fe_{17}X_\delta$, R=rare earth, La, or Y; X=H, C, N, B, F, P, and/or S, and R-TM-M-nitrogen including $R(Fe, M)_{12}X_\delta$, R=rare earth, La, or Y; M=Mo, V, Ti, Si, Al, Cr, Cu, Ga, Ge, Mn, Nb, Sn, Ta, W or Fe; X=H, C, N, B, F, P, and/or S.

6. The magnet of claim 1 comprising a rare-earth-transition metal based magnetic compound having the formula of $R_2TM_{14}A$, $RTM_5$, $RTM_{17}$, $R_2TM_{17}A$, $RTM_7$, $RTM_7A$, $RTM_{12}$, $RTM_{12}A$, $R_3TM_{29}$, or $R_3TM_{29}A$, wherein R is one or a combination of rare earths, La or Y, TM is one or a mixture of transition metals, A is one or a combination of the following elements: Be, B, C, N, S, Mg, Al, Si, P, Ga, Ge, As, Se, In, Sn, Sb, Te, I, Pb, or Bi.

7. The magnet of claim 1 which comprises consolidated powders.

8. A sintered rare earth permanent magnet comprising at least one region having a refined grain microstructure that includes a microstructure matrix and artificially-added grain-refining, submicron feedstock particles selected from at least one of carbide particles, fluoride particles, nitride particles, oxide particles, and/or sulfide particles dispersed in the mircostructure where they are non-reactive and insoluble without alteration of the matrix chemical composition and where the grain-refining submicron feedstock particles have an average particle size of less than 1 micron in the microstructure which has an average refined relatively fine grain size of about 22 to about 32 microns, wherein the at least one region having the refined grain microstructure provides the sintered magnet with at least one of mechanical toughness and/or mechanical strength beneficial for inhibiting micro-cracking of the magnet.

9. The sintered rare earth permanent magnet of claim 8 wherein the permanent magnet has a laminated microstructure that comprises said at least one region having the refined relatively fine grain size adjacent to another region having a relatively coarser grain size to form the laminated microstructure.

10. The magnet of claim 8 wherein the average particle size of the grain-refining submicron feedstock particles is about 0.35 micron or less.

11. The magnet of claim 8 which includes the artificially-added grain-refining, submicron feedstock particles in an amount of 0.5 to 10 weight %.

12. The magnet of claim 8 wherein said refined grain microstructure comprises the rare earth magnet alloy matrix comprised of sintered jet milled magnet alloy particles and the artificially-added grain-refining, submicron feedstock particles dispersed in the microstructure.

13. The magnet of claim 1 having a flexural strength of about 148 MPa or more.

14. The magnet of claim 1 wherein said refined grain microstructure comprises a matrix comprised of sintered jet milled feedstock particles and the artificially-added grain-refining, submicron feedstock particles dispersed in the microstructure.

* * * * *